(12) United States Patent
Hensel

(10) Patent No.: US 9,631,820 B2
(45) Date of Patent: Apr. 25, 2017

(54) COUNTERTOP OVEN ACCESSORIES

(71) Applicant: Breville Pty Limited, Botany, NSW (AU)

(72) Inventor: Keith James Hensel, Lane Cove (AU)

(73) Assignee: Breville Pty Limited, Alexandria, New South Wales (AU)

( * ) Notice: Subject to any disclaimer, the term of this patent is extended or adjusted under 35 U.S.C. 154(b) by 723 days.

(21) Appl. No.: 14/035,950

(22) Filed: Sep. 25, 2013

(65) Prior Publication Data

US 2014/0021835 A1    Jan. 23, 2014

Related U.S. Application Data

(62) Division of application No. 12/936,516, filed on Oct. 5, 2010, now Pat. No. 9,022,018.

(51) Int. Cl.
*F24C 15/12* (2006.01)
*A47J 47/00* (2006.01)
*A47J 37/06* (2006.01)
*F24C 15/16* (2006.01)

(52) U.S. Cl.
CPC ........... *F24C 15/12* (2013.01); *A47J 37/0629* (2013.01); *A47J 47/005* (2013.01); *F24C 15/16* (2013.01)

(58) Field of Classification Search
CPC ....... F24C 15/12; F24C 15/16; A47J 37/0629; A47J 47/005
See application file for complete search history.

(56) References Cited

U.S. PATENT DOCUMENTS 3,385,357 A * 5/1968 Burg .................... A47J 36/2483
165/185

* cited by examiner

*Primary Examiner* — Alfred Basichas
(74) *Attorney, Agent, or Firm* — Molins & Co. Pty Ltd

(57) ABSTRACT

A combination oven and cutting board. A bench-top oven having a metal upper surface; the oven further including: a cutting board; and wherein the upper surface having features that cooperate with the cutting board; and the cutting board having heat resistant feet that interlock with the features.

20 Claims, 12 Drawing Sheets

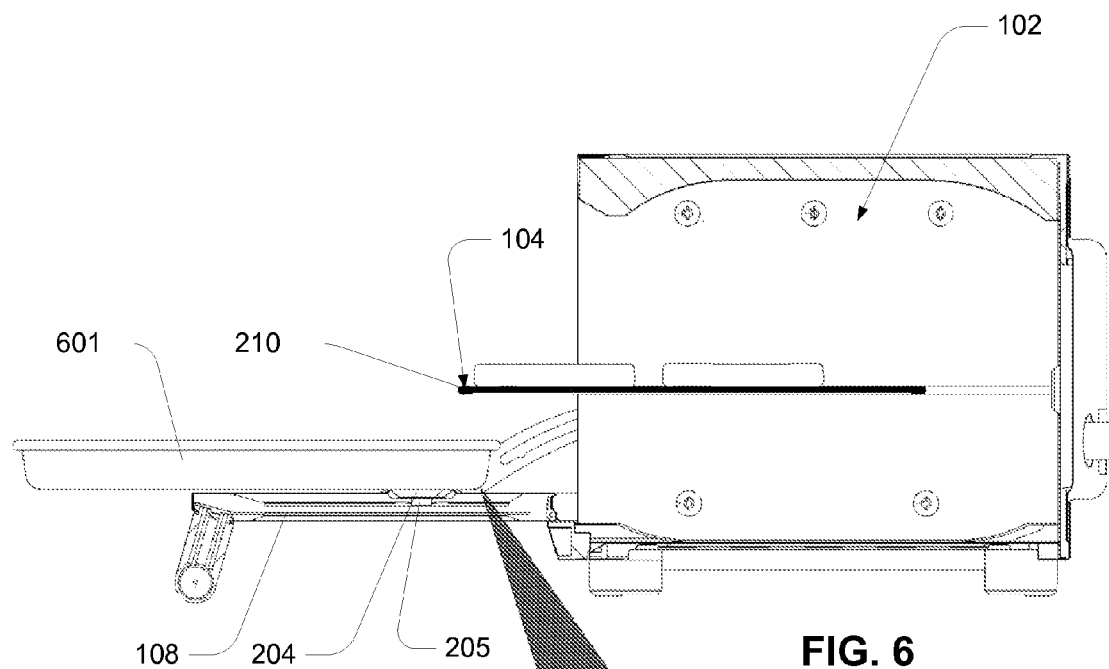
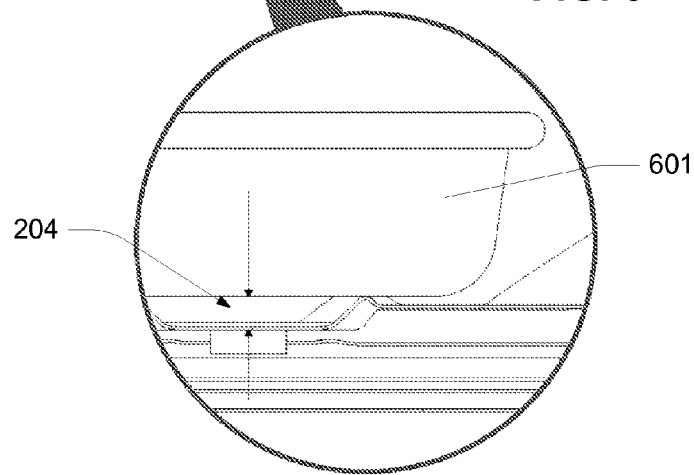
FIG. 7

COUNTERTOP OVEN ACCESSORIES

FIELD OF THE INVENTION

The present technology relates to accessories for counter top appliances, in particular, ovens such as convection ovens, toaster ovens and microwave ovens.

BACKGROUND OF THE INVENTION

Benchtop or countertop ovens can be used to conveniently warm food such as muffins, pizzas, or bagels. They may be used to cook meals. After the heating or cooking process is finished, a user may pull out a rack from inside the oven, so as to access the food item, or allow the food item to cool. It is possible for a user to be burned while doing so. The term oven is intended to broadly denote all types of ovens. In this specification examples are provided with reference to an infrared oven.

A benchtop or countertop takes up counter space. In a kitchen with limited counter space, the loss of space creates an inconvenience for the user. In this specification reference is made to cutting boards, serving trays and trays, it being understood that a suitable flat surface can be used for all or some of these purposes.

OBJECTS AND SUMMARY OF THE INVENTION

It is an object of the present technology to facilitate the partial removal of a rack from an oven such as toaster oven.

It is a further object of the present invention to address the loss of counter space occupied by a benchtop or countertop oven.

Accordingly, there is provided an oven having an oven body that defines a cavity, the cavity having a support structure for supporting a rack. At least a front portion of the rack is paramagnetic. The cavity is closed by a door that is hinged to a lower front portion of the oven body. The door further has lateral frame elements, and at least one frame element comprises a magnet. The magnet is adapted to engage and attract the front portion of the rack.

There is further provided, alone or in combination with an oven, a tray or cutting board with location feet that correspond with and cooperate or interlock with the pattern of the top surface. The tray resists overheating.

There is also provided, in combination, a benchtop oven and cutting board comprising a benchtop oven having a front opening door and a metal upper surface. The upper surface has features that cooperate with the cutting board and the cutting board has heat resistant feet that interlock with the features.

In some embodiments the cutting board is a bamboo composite.

In other embodiments the metal upper surface of the oven has a pattern of ribs within a recessed area that serve as a locating feature for the cutting board.

Also provided is an oven with an internal heating cavity and a front opening door that is horizontally hinged to a lower front portion of the oven body, the cavity has opposing support structures for supporting one or more metal racks. The door incorporates a magnet that is used to pull a rack out of the oven.

In preferred embodiments, the magnet is located such that a rack in the cavity is under the influence of the magnet when the door is closed.

BRIEF DESCRIPTION OF THE DRAWING FIGURES

In order that the invention be better understood, reference is now made to the following drawing figures in which:

FIG. 6 is a cross section view of the toaster oven depicted in FIG. 1, wherein the door is fully open;

FIG. 7 is a side elevation detail view of the tray or cutting board and oven door shown in FIG. 6;

BEST MODE AND OTHER EMBODIMENTS

The following disclosure pertains, to features that are useful in conjunction with many oven styles and particularly, a benchtop or countertop oven. It will be appreciated that the features of the magnetic rack extraction with vertically hinged door are not limited to any particular oven type. Similarly the space saving tray or cutting board is intended for use in conjunction with any large benchtop or countertop appliance such as a microwave, convection or toaster oven, but it is particularly useful where space saving is required or where other types of trays or boards might overheat to unacceptable levels.

Figure 1:
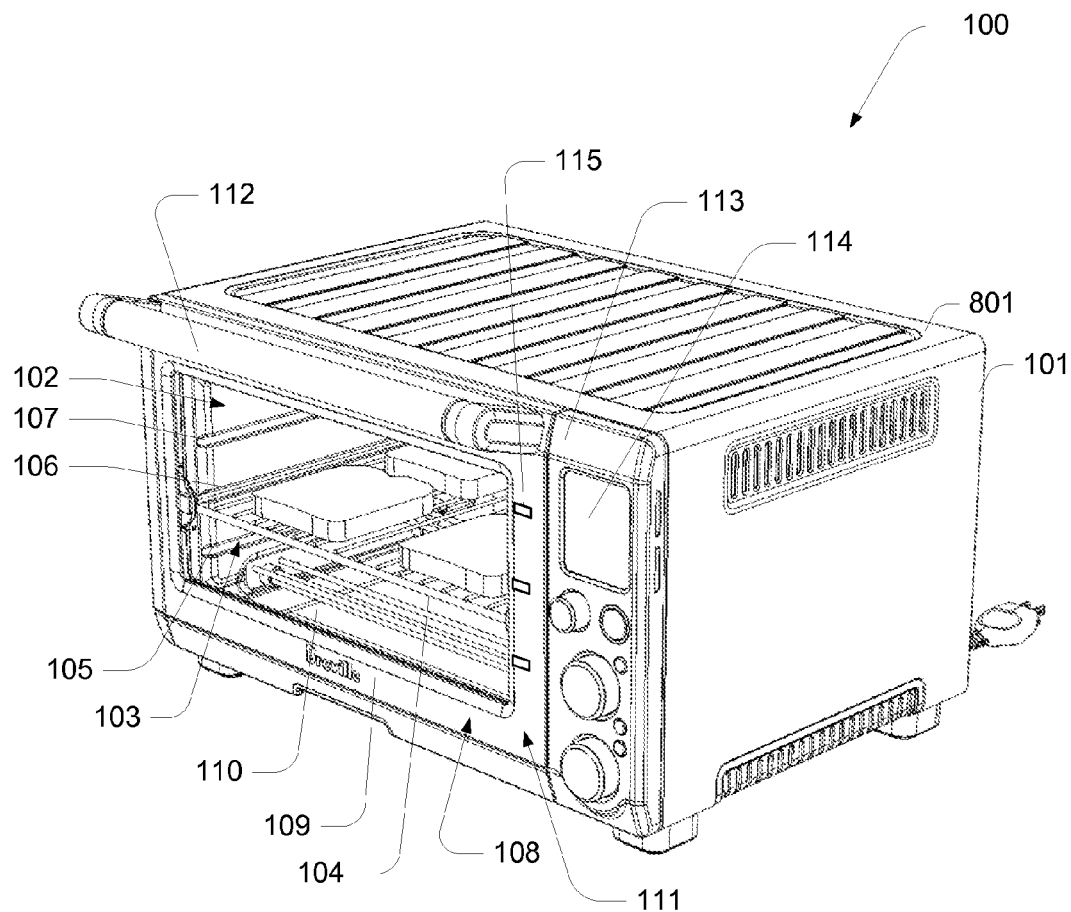
FIG. 1 is a perspective view of a toaster oven in accordance with the present technology.

Referring to FIG. 1, a benchtop or countertop oven, such as a toaster oven 100 comprises an oven body 101 having an internal heating cavity 102. The interior walls of the cavity 102 have opposing support structures 103 for supporting any number (one or more) of metal racks 104. As shown, the support structures 103 comprise grooves that are formed into the interior walls, the grooves defining three rack positions 105, 106, 107 that are roughly 40 mm apart. As will be explained, the middle position is preferably a "rack pull-out" position. In this position, an opening of the oven door automatically causes the rack 104 to be pulled out. Other support structures, for example knobs or stubs that support the racks, may be used. In some embodiments, the support structure may define a different number of tray positions.

To help a user identify the correct rack position for a particular food labels 115 are affixed to or printed on the door 108. The labels 115 suggest suitable food items or cooking methods for each rack position. The locations of the labels correspond to the rack positions.

A front opening door 108 is horizontally hinged to a lower front portion of the oven body. As shown, the door 108 comprises a frame 109 that surrounds a glass window 110. The door 108 further carries a horizontal handle 112.

In this embodiment, the toaster oven 100 further comprises a control panel 113. The control panel 113 is shown to be located along the front surface in of the toaster oven, and adjacent to the front opening door 108. As shown, the control panel 113 comprises a display 114 and an array of user operable controls.

Figure 2:
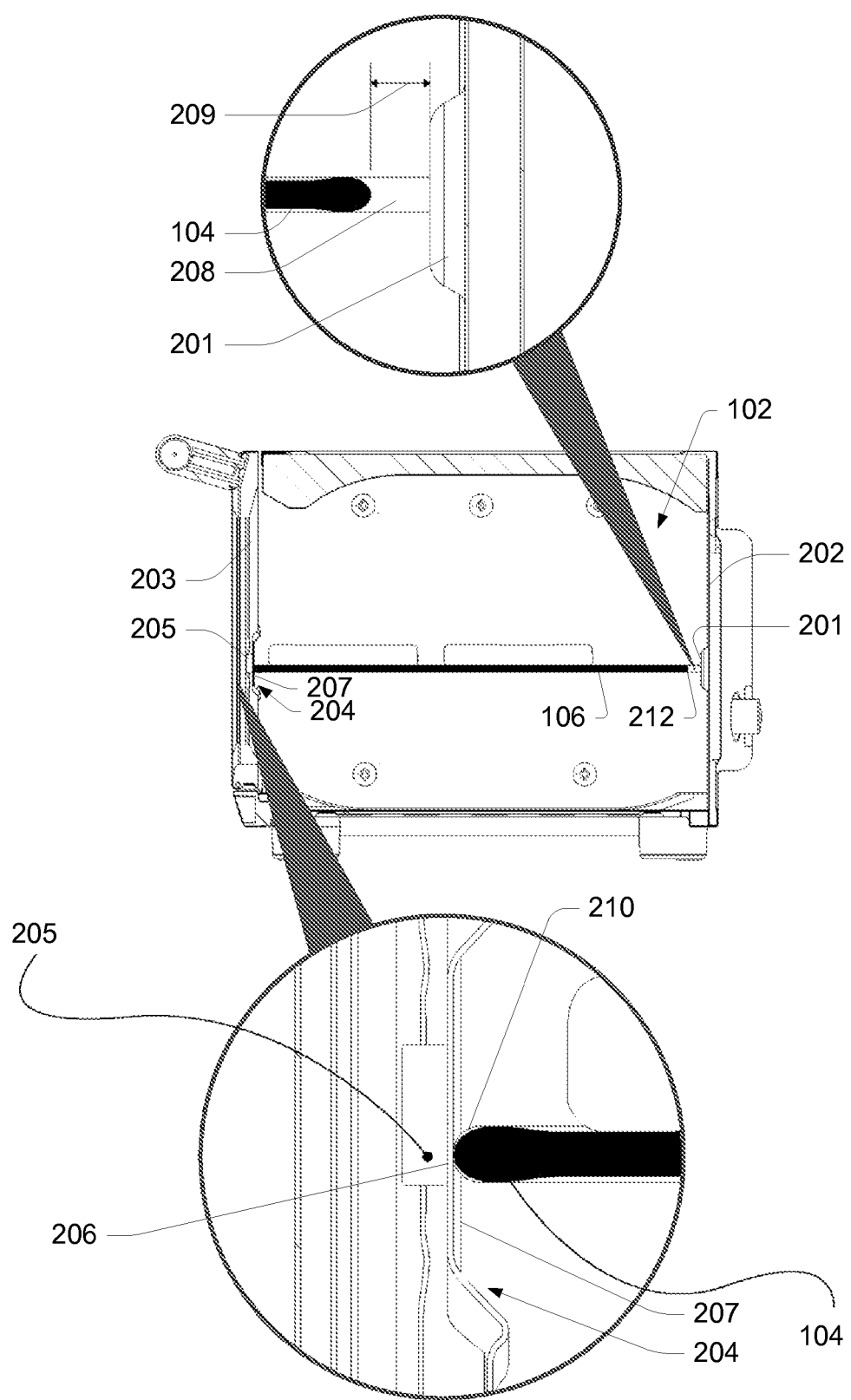
FIG. 2 is a cross section view of the toaster oven depicted in FIG. 1.

Referring to FIG. 2, a rear bumper 201 is provided along the rear surface 202 of the cavity 102. The rear bumper 201 is located such that it corresponds to the "rack pull-out" position 106. The bumper serves to urge the middle rack forward relative to the other racks. This is done so that the forward edge 210 of the rack is advanced forward and toward the door more than in the other positions. In this way the forward edge 210 can enter the recesses 204 forward in each lateral edge of the door. The recesses 204 are provided to space the magnets 205 away from the inner surface of the door, as will be explained.

A magnet 205 is provided in a cavity behind at least one recess 204 located on an inner surface of the door. The one or more recessed magnets are used to pull the middle rack out of the oven. A rear edge 206 of the magnet 205 is located parallel or flush with a floor 207 of the recess 204. The recess 204 and magnet 205 are located such that they are adjacent to the position 106. The magnet 205 is located such that a rack 104 placed into the middle position 106 is under the influence of the magnet 205 at least when the door is closed.

The rack 104 is sized such that a clearance 208 is left between the rear edge 211 of the rack 104 and the rear bumper 201. In this example, the clearance 208 is about 2 mm.

Figure 3:
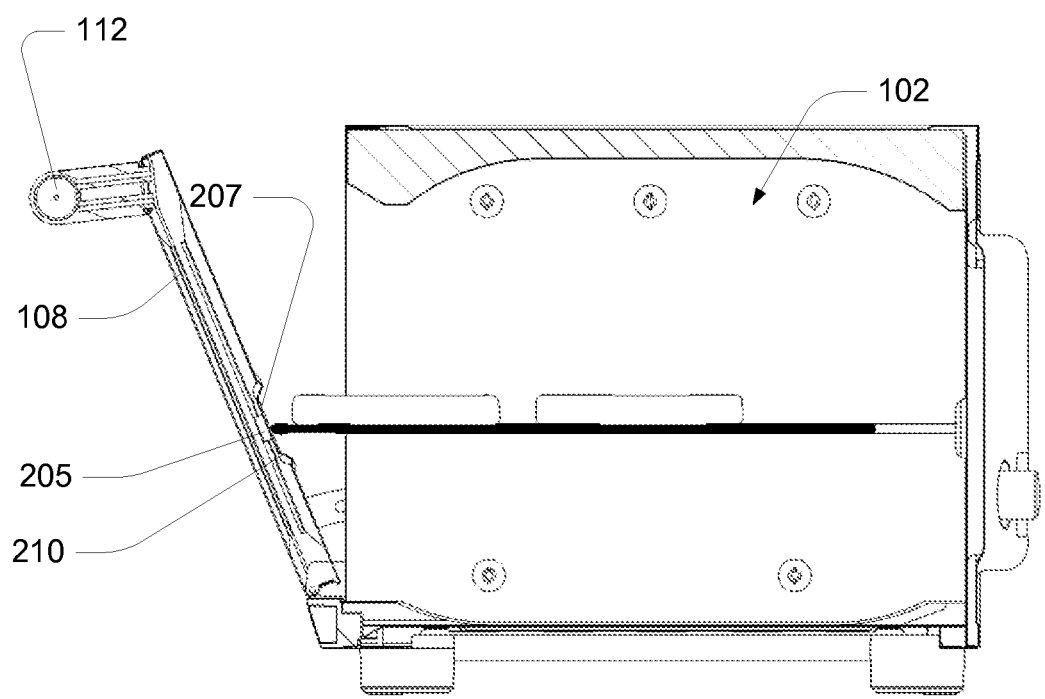
FIG. 3 is a cross section view of the toaster oven depicted in FIG. 1, where the door is partially open.
Figure 4:
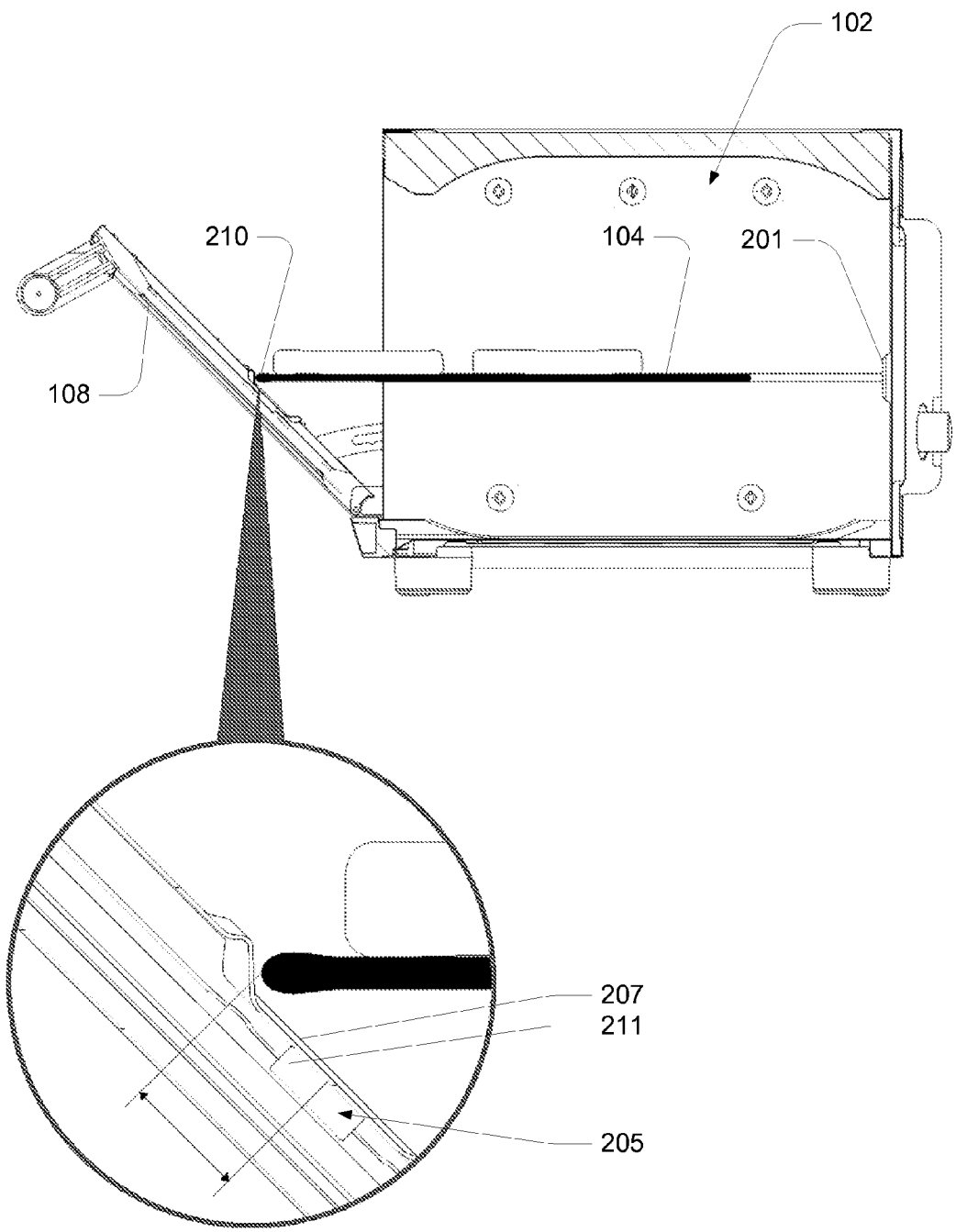
FIG. 4 is a cross section view of the toaster oven depicted in FIG. 1, where the door is partially open.
Figure 5:
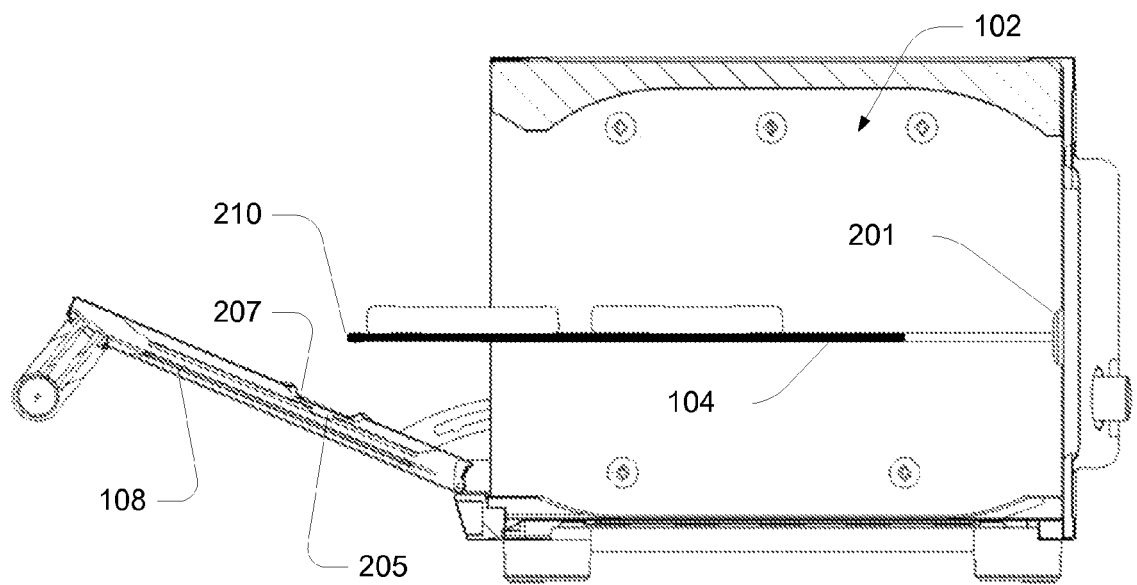
FIG. 5 is a cross section view of the toaster oven depicted in FIG. 1, where the door is partially open.

Referring to FIG. 3 through FIG. 5, as the door 108 is opened, it pivots downwardly. Under the influence of the magnet 205, the rack 104 is displaced forward as the magnet is displaced, and is therefore pulled partially, but not fully out of the cavity 102. The displacement of the rack 104 is horizontal, whereas the displacement of the magnet is an arc of a circle. The front edge 210 of the rack 104 moves forward and at the same time advances along the recess floor 207, until the front edge 210 reaches beyond a top portion 211 of the magnet 205. The front edge 210 eventually comes away and ceases to be under the influence of the magnet 205 and is not pulled out any further. In this example, the strength of the magnet 205 and the recess 204 are configured so as to cause the tray to be pulled out by approximately 72 mm.

Referring to FIG. 6 and FIG. 7, the door 108 is horizontal when it is completely open. After a user removes a dish, a plate, or a food item from the rack 208, he or she may sometimes place it on the inner surface of the open door 108. In some cases the dish, plate, or tray 601 is paramagnetic, and it is desirable that the tray 601 is not held to the door 108 by the magnets 205. Because the magnet 205 is located in the recess 204, the bottom of the tray 601 does not contact the magnet 205. It is also desirable that the magnet 205 in the recess 204 is weak enough so that its magnetic attraction does interfere with the handling of a tray 601 placed on the door 108.

It will be appreciated that the extraction of the tray as performed by the magnetic field of a door mounted magnet will also work if the magnet is instead mounted onto the tray and attracted equally to a paramagnetic portion of the door. If this embodiment were executed, the door would not require a recess because a metal pan placed onto the open door would not be attracted to the door. Importantly, the magnetic attraction between the rack and the door (regardless of where the magnet is) and the geometry of the door and rack arrangement dictate that the rack be pulled or extracted from the cavity, but only partially, even when the door is fully open. That arrangement and geometry also causes the useful decoupling of the rack and door when the rack has been extracted a useful amount, without disconnecting the rack from its guides within the cavity.

Figure 8:
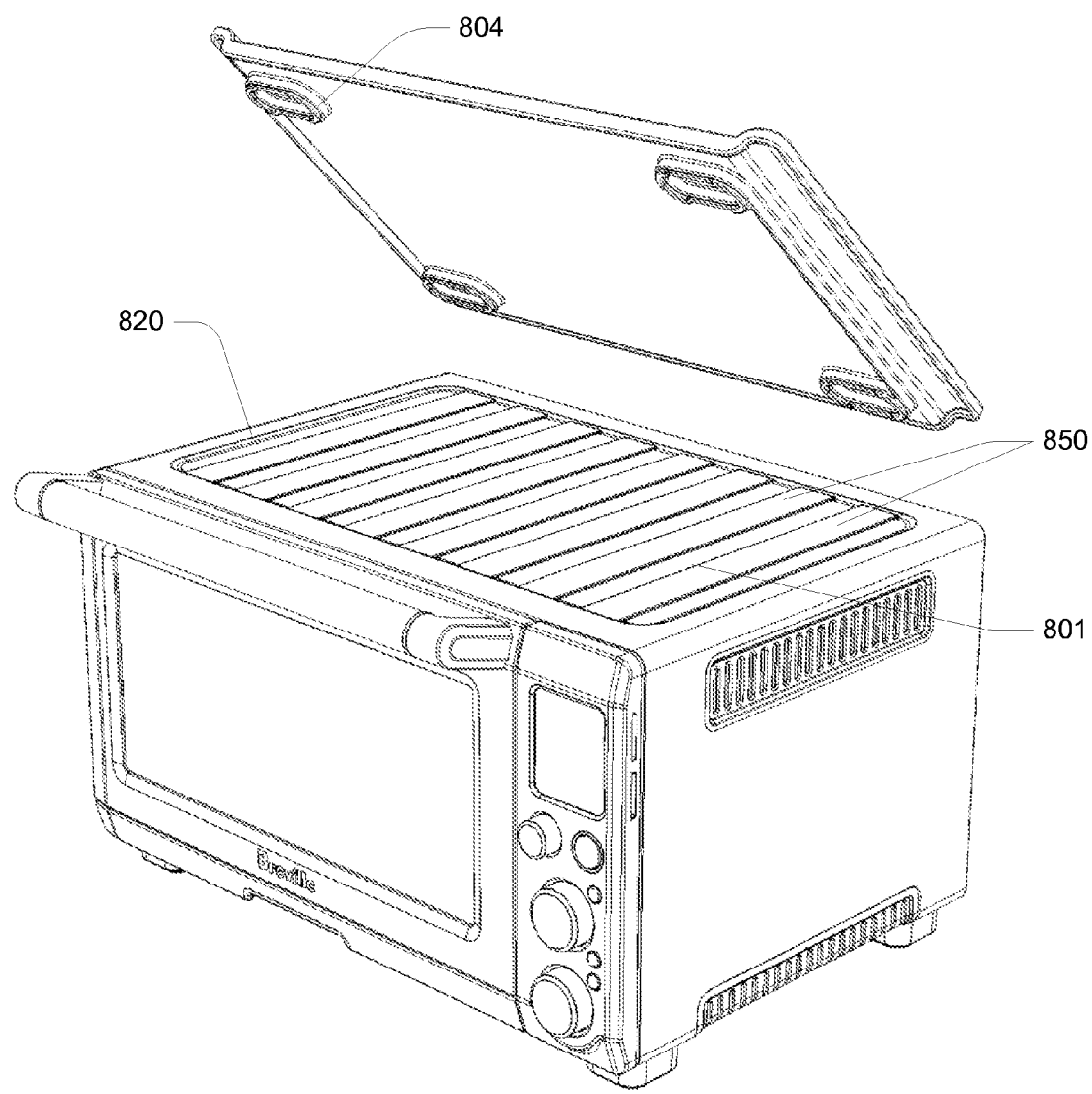
FIG. 8 is a perspective view of an oven and cooperating tray.

Referring to FIG. 8, the toaster oven may provide a specially configured surface for an interlocking retaining a tray or cutting board or work surface for the user. A top surface 801 of the toaster oven may be embossed, indented, or otherwise patterned. In the example the pattern consists of an array of parallel ribs 850 within a rectangular recess. A tray, for example a wood, bamboo or moulded melamine tray 802, may carry feet or stubs that engage or interlock with the pattern of the top surface. In one example, the melamine tray 802 has location feet 804 that receive the raised portions 850. The cooperation between the location feet 804 and the raised ribs or portions 850 help locate the tray 802 on the top surface 801. In particular the location is such that the front edge of the work surface, tray or board is recessed back (e.g. 20 mm) from the front edge of the upper surface 801 of the oven. This keeps the work surface, tray or board away from heat and moisture that rise from the oven cavity when the door is opened. The interlocking of the feet and raised portions also provide the user with visual and tactile clues that assist the user in locating the work surface, tray or board in a stable orientation away from the rounded lateral edges of the top surface 801. The interlocking not only correctly positions the tray or cutting board, but it also helps the tray or board resisting or leaving the correct orientation when the oven is bumped or the door is closed etc.

Figure 9:
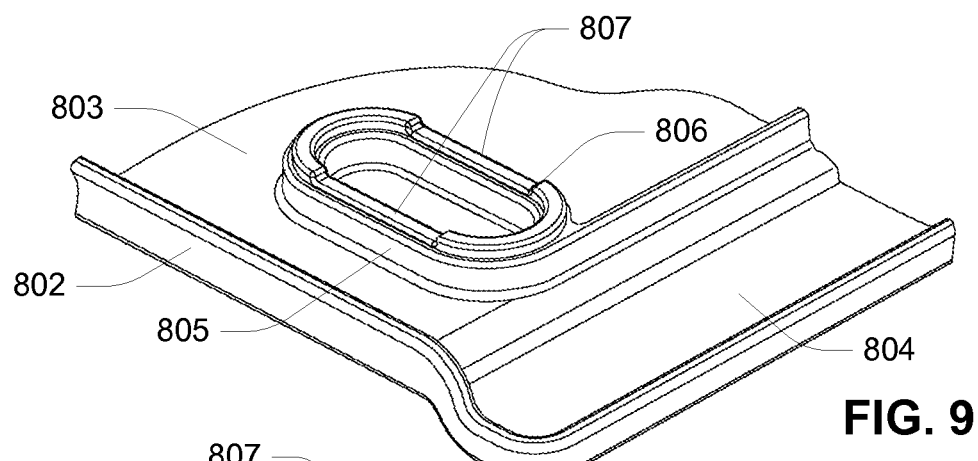
FIG. 9 is an inverted perspective view of the tray depicted in FIG. 8.
Figure 10:
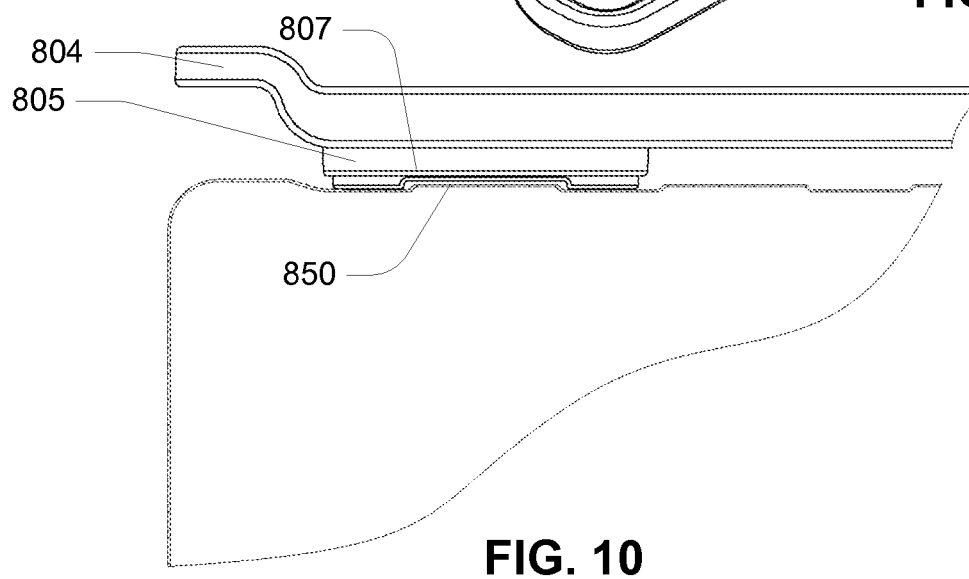
FIG. 10 is a side elevation of the oven and tray.
Figure 11:
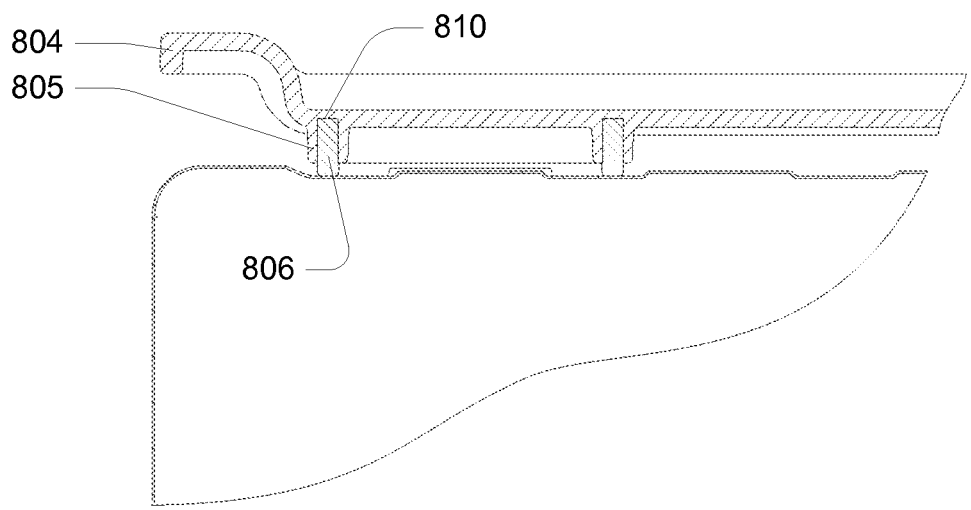
FIG. 11 is a cross sectional view of the oven and tray depicted in FIG. 10.

As shown in FIG. 9, a melamine tray 802 comprises a recessed deck 803 with opposing, parallel handles 804 that are elevated above the deck 803. The four corners of the deck area 803 are characterised by integral oval shaped surrounds 805 that are adapted to receive moulded polymeric feet 806. The lowest edge of the feet 806 is recessed in two positions 807 so as to accommodate the raised portions 850 as shown in FIG. 11, the surrounds 805 may be formed with a central groove 810 for receiving the oval shaped polymeric insert 806. The insert may be moulded from a silicone rubber or other compound that is heat resistant. The underside of the work surface, tray or board may be in contact with or elevated above the upper surface of the oven. The work surface, tray or board provide a useful stand-alone object, a recuperation of lost counter space and an area of reduced heat compared to the upper surface of the oven.

Figure 12:
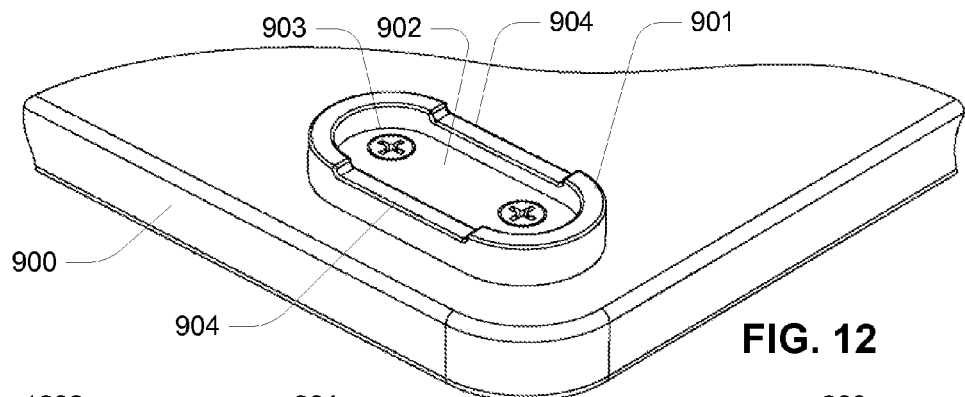
FIG. 12 is an inverted perspective view of a cutting board and foot.
Figure 13:
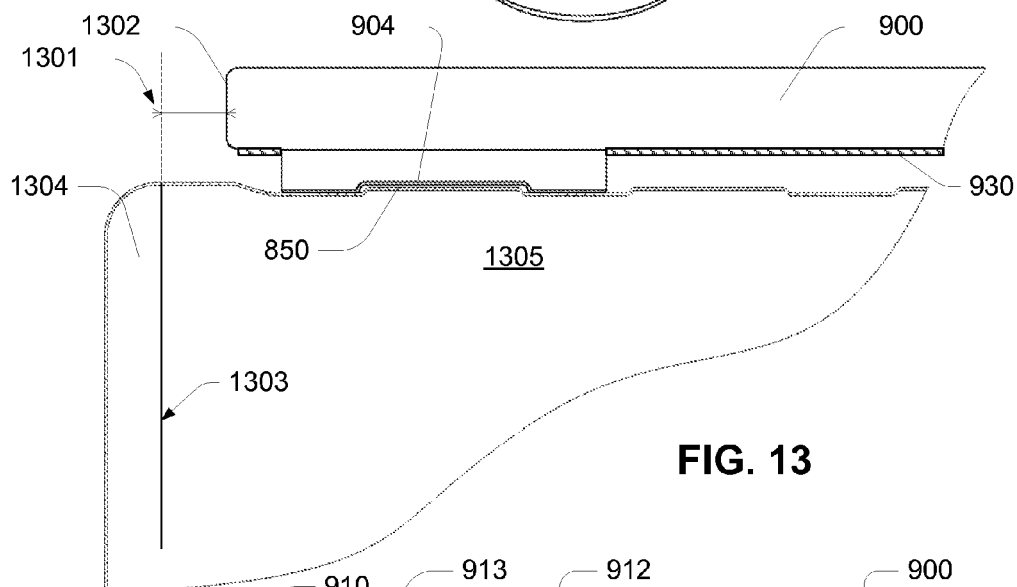
FIG. 13 is a side elevation illustrating the oven cooperating oven board.
Figure 14:
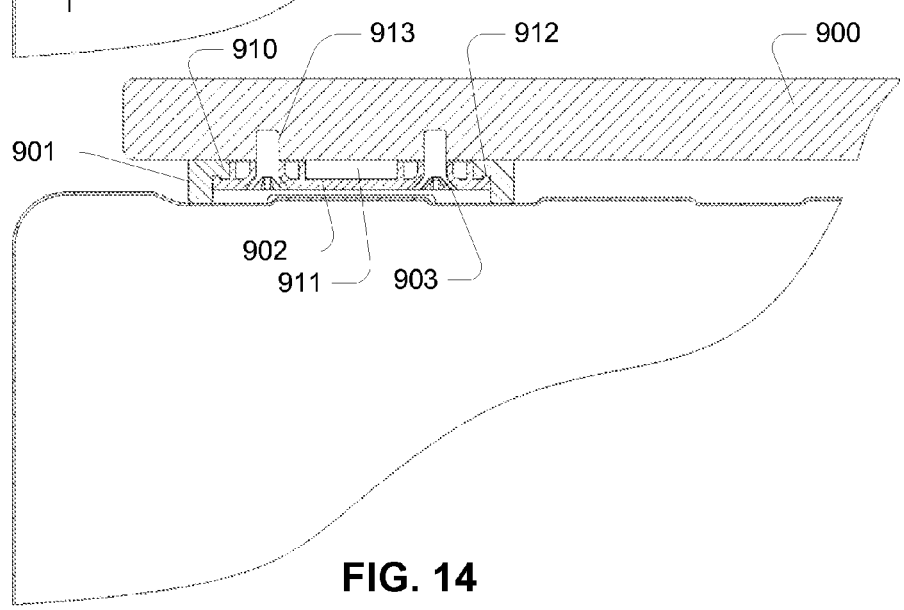
FIG. 14 is a cross sectional view of the oven and cutting board depicted in FIG. 13.

As shown in FIG. 12, a cutting board such as a bamboo composite cutting board 900 may be provided in place of the melamine tray disclosed with reference to FIG. 8 through FIG. 11. In this example, the four corners of the cutting board 900 are associated with polymeric feet 901 that are retained by central rigid plates 902 that are fastened to the board 900 by threaded fasteners 903. The feet 901 feature grooves 904 that cooperate with the raised portions 850 as shown in FIG. 13 and FIG. 14. FIG. 13 also illustrates that the underside of the work surface, tray or board can have affixed to it, a heat reflective surface member 930 such as a stainless steel sheet. The sheet 930 may be sandwiched between the feet and the underside of the work surface, tray or board. In the absence of a reflective member, the underside (particularly of a melamine work surface, tray or board) may be a lighter colour to minimise heat absorption. FIG. 13 also illustrates a preferred set-back of the front edge 1302 of the cutting board 900 with respect to the gap 1303 between the front opening oven door 1304 and the body 1305 of the oven. In all embodiments it is a preferred feature that the set back, when the feet 901 are seated on the ribs or features, be about 2.5 cm or 1 inch. This minimises the impact of heat rising from the cavity of the oven when the door is open.

As shown in FIG. 14, the feet 901 have an internal shoulder 910 and a central opening 911. The plate 902 has a peripheral ridge 912 that engages the shoulder 910 when the fasteners 903 are driven into their respective openings 913 in the cutting board 900.

Figure 15:
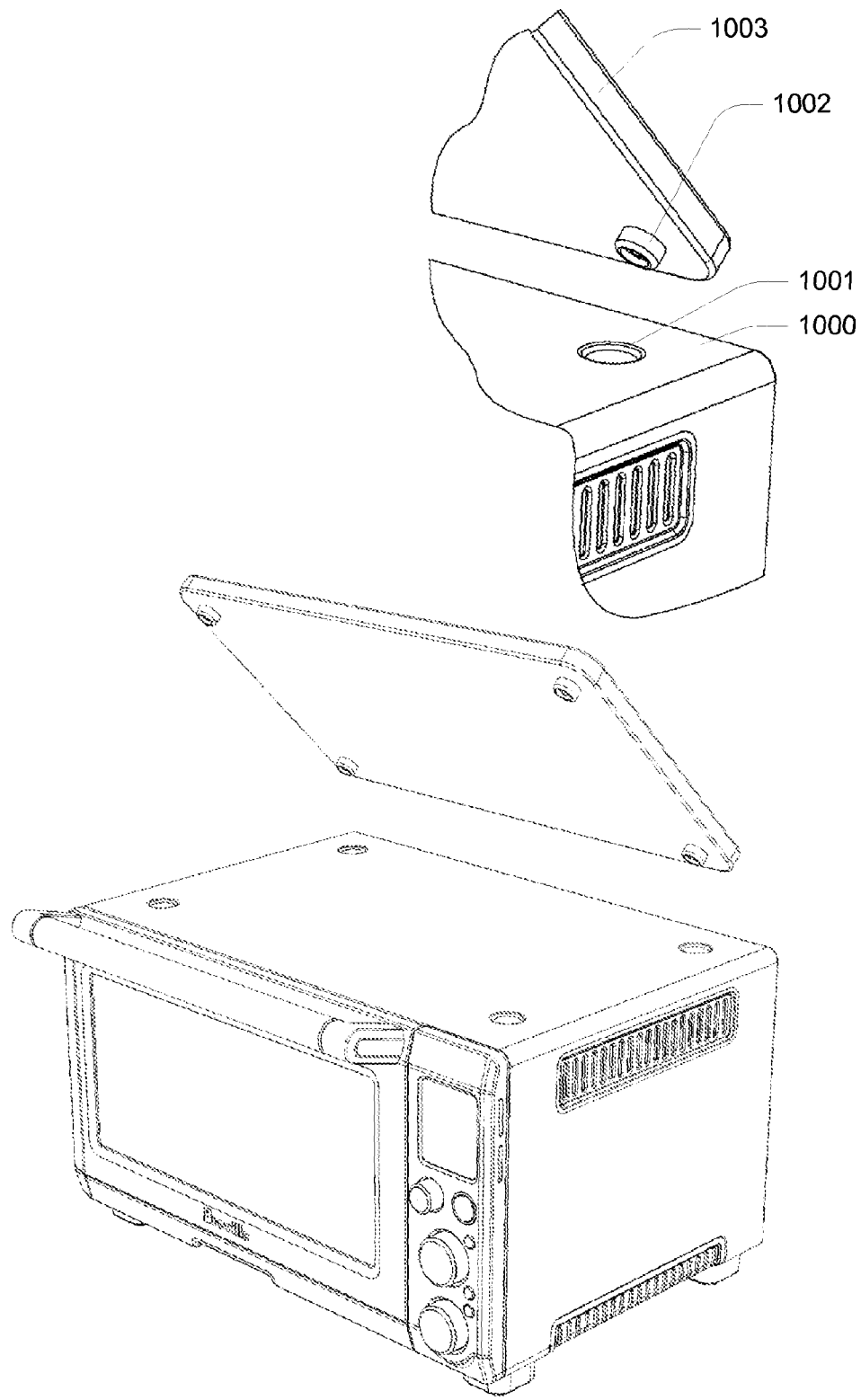
FIG. 15 is a partial perspective view of an oven and cutting board.

As shown in FIG. 15, the stainless steel sheet metal top surface of the oven 1000 includes indentations 1001, such as circular indentations, that are adapted to receive round feet 1002 formed on the bottom of a tray or cutting board 1003. In preferred embodiments, the tray or cutting board 1003 includes four such round feet 1002 and the top of the oven has four corresponding indentations 1001.

Figure 16:
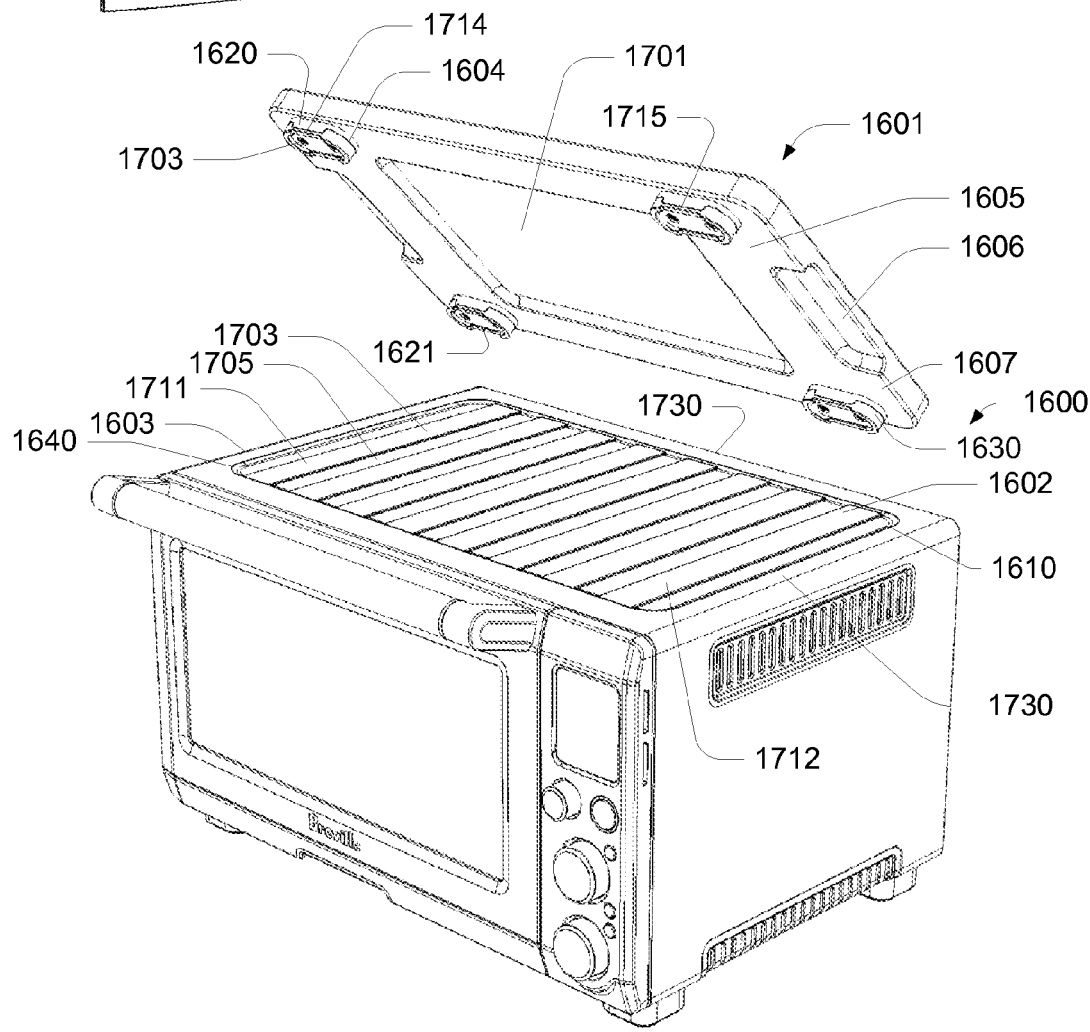
FIG. 16 is a perspective view of an oven with cooperating or interlocking bamboo tray.

As shown in FIG. 16, an oven 1600 has a cooperating tray 1601 or chopping board 1601 fabricated from a bamboo and resin composite material. The upper surface 1603, having a pattern of ribs within a recessed area 1610 of the top surface can be used as a stainless steel storage area of plate warmer that rigidised by the transverse ribs 1711. It can also serve as a locating surface for the interlocking tray 1601. The composite is adapted to remain stable at elevated temperatures and the bamboo naturally contains substances that make the cutting board or tray resistant to microbial attack. The tray 1601 is adapted to interlock with features (in this example fore and aft ribs 1602) formed on an upper pressed metal surface 1603 of the oven 1600. It is particularly well adapted to be used as a serving tray because the bamboo composite is well adapted to receive hot cooking vessels when they come out of the oven 1600. Hot vessels can then be bought to the table on top of the tray 1601. The special construction of the tray's underside and feet 1604 contribute to this kind of utility and versatility in several ways.

Figure 17:
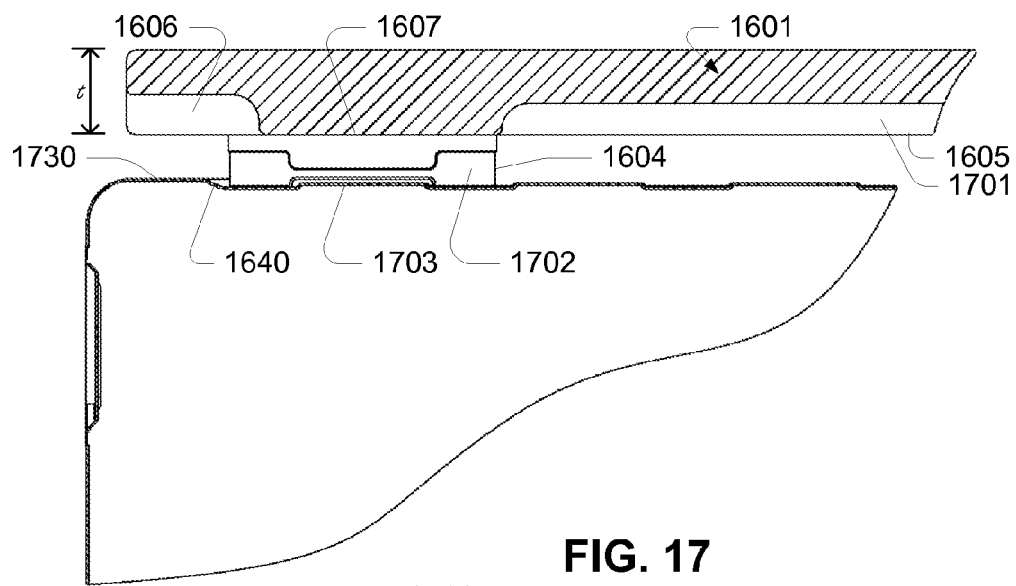
FIG. 17 is a cross section of the tray and foot.
Figure 18:
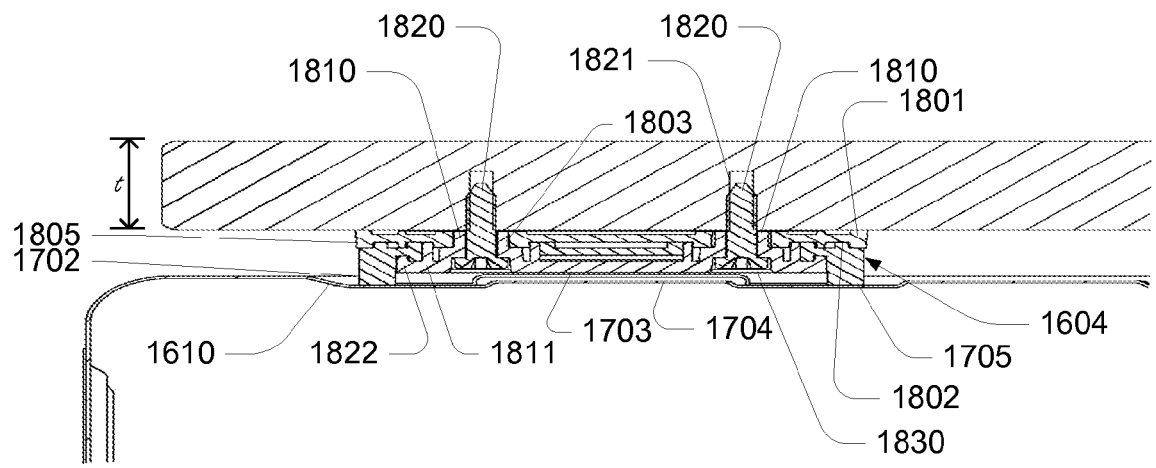
FIG. 18 is a cross sectional view of the tray's foot.

As shown in FIGS. 17 and 18, the silicone foot 1604 and tray 1601 have features that combine to make the tray 1601 more useful in the hot conditions associated with the pressed metal top surface 1603 of an oven such as a toaster oven.

As suggested by FIG. 17, the maximum thickness of the resin impregnated bamboo composite "t" is about 19 mm. The tray has a central recess or undercut 1701 that assists in ventilation and heat dissipation. The depth of the central undercut or recess is about 7 mm. A handle recess is provided at and along the lower edge of each end of the tray. The handle recess also aids in heat dissipation. The depth of the handle recess 1606 is about 9 mm. But for the handle recesses 1606, a full thickness border area 1607 surrounds the central recess 1701. In this example, four feet are fastened onto the underside of the tray 1601 on this border area 1607.

As shown in FIG. 17 and FIG. 18, each foot 1604 has a lowermost, oven contacting portion 1702 that is fabricated from heat resistant silicone. The descending oval shaped rim 1630 of the contact portion 1702 is adapted to interlock with features formed into the upper surface 1603 of the oven 1600. In this example, each of the four feet has a groove 1714, 1715 in the rim 1630 that fits over a rib 1704 formed into the stainless upper surface 1603. In this example, the pressed stainless steel upper surface 1603 further comprises a primary recess 1610 within which are located the parallel ribs 1703, separated by parallel sunken grooves 1705. The tops of the ribs are at or just below the surrounding top surface 1730. The spacing between the ribs 1703 that are farthest apart 1711, 1712 is the same as the spacing between the left and right pairs of foot grooves 1714, 1715. The length of the primary recess 1610 (extending fore and aft) corresponds to the distance between a forward vertical surface 1620 of the two forward feet 1604 and an aft vertical surface 1621 of the rear feet. Thus, not only do the grooves in the foot interlock with a particular pair of ribs 1711, 1712. The outside margins of the feet also assist in centering and stabilising the tray within the corners of the primary recess 1610.

As previously mentioned, the oven contacting or contact portions 1702 of each foot 1604 are fabricated from a heat resistant silicone. The silicone not only remains stable across a wide range of temperatures, but also dissipates heat rapidly. This makes transfer of the tray from the oven to heat sensitive surface such as a varnished wood table top possible.

The silicone contact portions 1702 may be affixed directly to the underside 1607 of the tray. However, the example depicted in FIG. 18, a nylon intermediate member 1801 is used both to receive moulded interlocking ribs 1802 formed on an upper surface of the silicone contact portion 1702 and also to provide additional height between the upper surface of the oven and the underside of the tray thus reducing the consumption of the more expensive silicone polymer. The intermediate portion 1801 is a heat stable stiff polymer such as nylon and has through openings 1803 for receiving a pair of bosses 1810 that are associated with a nylon fastener plate 1811. The peripheral vertical edge surface 1805 of the intermediate member 1801 provides a convenient location for printing, such as warnings or recommendations.

The fastener plate 1811 provides a pair of through openings for receiving stainless steel threaded fasteners 1820 that are received by blind openings 1821 formed into the underside of the tray 1601. The fastener plate 1811 has a peripheral rib 1822 that interlocks with a peripheral groove formed into the contact portion 1702. Thus, tightening the fasteners 1820 effectively clamps the silicone contact portion 1702 between the fastening plate 1811 and the underside of the intermediate portion 1805 or (in some embodiments) the underside of the tray 1601. In this embodiment, the underside of the fastening plate 1811 has countersunk openings 1830 for receiving the heads of the fasteners 1820. In preferred embodiments, the height of the foot, from the underside of the tray to the bottom of the contact portion is about 12 mm.

While the present invention has been disclosed with reference to particular details of construction, these should be understood as having been provided by way of example and not as limitations to the scope or spirit of the invention.

What is claimed is:
1. A bench-top oven having a metal upper surface; the oven further including:
   a cutting board; and
   wherein the upper surface has features that cooperate with the cutting board; and the cutting board has heat resistant feet that interlock with the features;
   wherein each of the feet comprise a rigid fastener plate fixed to the underside of the cutting board; and wherein each of the feet has a lowermost oven-contacting portion that is fabricated from a separate heat resistant polymer that is retained by the fastener plate.

2. The oven of claim 1, wherein the upper surface has a pattern of ribs within a recessed area that serve as a locating feature for the cutting board.

3. The oven of claim 2, wherein the ribs have tops and the tops of the ribs are at or just below a surrounding top surface.

4. The oven of claim 2, wherein the lowermost oven-contacting portion of each foot is fabricated from heat resistant silicone that is adapted to interlock with the features formed into the upper surface.

5. The oven of claim 2, wherein each of the feet has a downwardly protruding rim with a groove that fits over a respective one of the ribs.

6. The oven of claim 1, wherein the upper surface further comprises a primary recess within which are located a plurality of parallel ribs separated by parallel sunken grooves.

7. The oven of claim 6, wherein an outside margin of each of the feet assists in centering and stabilising the cutting board within the corners of the recess.

8. The oven of claim 1, wherein a polymer intermediate member is used both to receive a silicone contact portion of each of the feet, the and providing additional height between the upper surface and an underside of the board; and the fastener plate is fixed beneath the intermediate member to clamp the silicone contact portion.

9. The oven of claim 1, wherein the cutting board is a bamboo composite.

10. The oven of claim 1, wherein the board has two ends, and a handle recess is provided along a lower edge of each end.

11. The oven of claim 1, wherein:
the upper surface of the oven defines the features in the form of a plurality of parallel ribs separated by parallel sunken grooves that locate the cutting board; and
the cutting board having four feet that each engage with the features defined by the upper surface of the oven;
each of the four feet comprise a rigid support member, a heat resistant silicone contact portion, and the fastener plate;
the rigid support member is located beneath the cutting board to provide additional height between the upper surface and an underside of the board, and receives the silicone contact portion;
the fastener plate is fixed beneath the intermediate member to clamp the silicone contact portion, while enabling the silicone contact portion to engage the upper surface of the oven.

12. The oven of claim 11, wherein:
the rigid support member is has a recess that receives a moulded interlocking rib formed on an upper surface of the silicone contact portion.

13. The oven of claim 12, wherein:
the fastener plate has a peripheral rib that interlocks with a peripheral groove formed on an underside of the silicone contact portion.

14. The oven of claim 13, wherein:
the silicone contact portion is clamped between the rigid support member and the fastener plate.

15. The oven of claim 14, wherein:
the rigid support member has a pair of through openings for receiving a respective one of a pair of bosses formed on the fastener plate.

16. The oven of claim 15, wherein:
the fastener plate has countersunk openings for receiving fasteners that are further received by the through openings of the rigid support member and blind openings formed into the underside of the cutting board.

17. The oven of claim 16, wherein:
the silicone contact portion has a descending oval shaped rim that is adapted to interlock with one of the rib features formed by the upper surface of the oven.

18. The oven of claim 17, wherein:
the rigid support member and fastener plate is formed of nylon.

19. The oven of claim 11, wherein:
the silicone contact portion has a descending oval shaped rim that is adapted to interlock with one of the rib features formed by the upper surface of the oven; and
descending oval shaped rim has a groove that enables the silicone contact portion to fit over the rib features formed by the upper surface of the oven.

20. The oven of claim 11, wherein:
the rigid support member and fastener plate is formed of nylon.

* * * * *